United States Patent
Hsi et al.

(10) Patent No.: US 8,604,642 B2
(45) Date of Patent: Dec. 10, 2013

(54) POWER SUPPLY SWITCHING SYSTEM

(75) Inventors: Mao-Shun Hsi, New Taipei (TW);
San-Yuan Chuang, New Taipei (TW);
Hong-Wen Chao, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 168 days.

(21) Appl. No.: 13/195,007

(22) Filed: Aug. 1, 2011

(65) Prior Publication Data
US 2012/0228940 A1  Sep. 13, 2012

(30) Foreign Application Priority Data
Mar. 9, 2011  (TW) .............................. 100107997 A

(51) Int. Cl.
*H02J 1/00* (2006.01)
*H02J 3/00* (2006.01)

(52) U.S. Cl.
USPC .......................................................... 307/80

(58) Field of Classification Search
USPC ............. 307/52, 64–66, 80, 86–87, 130, 150
See application file for complete search history.

(56) References Cited

U.S. PATENT DOCUMENTS

| | | | | |
|---|---|---|---|---|
| 5,150,032 A | * | 9/1992 | Ho | 320/130 |
| 5,229,706 A | * | 7/1993 | Fujiwara | 320/150 |
| 2003/0085626 A1 | * | 5/2003 | Odaohhara | 307/150 |
| 2011/0163604 A1 | * | 7/2011 | Hong et al. | 307/66 |
| 2012/0049631 A1 | * | 3/2012 | Chen et al. | 307/66 |

* cited by examiner

*Primary Examiner* — Rexford Barnie
*Assistant Examiner* — Rasem Mourad
(74) *Attorney, Agent, or Firm* — Altis Law Group, Inc.

(57) ABSTRACT

A power supply switch system for switching power supply to an electronic device, includes an adaptor, a charger module, a battery electrically connected to the charger module and a switch module. The adaptor outputs a voltage signal. The charger module receives the voltage signal and outputs control signals. The switch module receives the control signals and switches the adaptor and the battery to provide power supply to the electronic device. When the adaptor is powered on, the charger module controls the switch module to turn off a first connection between the battery and the electronic device; the charger module controls the switch module to turn on a second connection between the adaptor and the electronic device; and the adaptor provides the power supply to the electronic device.

12 Claims, 4 Drawing Sheets

POWER SUPPLY SWITCHING SYSTEM

BACKGROUND

1. Technical Field

The present disclosure relates to switch systems, especially to a power supply switching system for switching power supplies of an electronic device.

2. Description of Related Art

Both adaptors and batteries can power electronic devices such as portable computers and panel computers. A selector chip is commonly used to switch power supply between the adaptors and batteries. However, a typical selector chip is usually very expensive and requires a plurality of peripheral components, which increases costs and space of the electronic devices.

Therefore there is a need for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
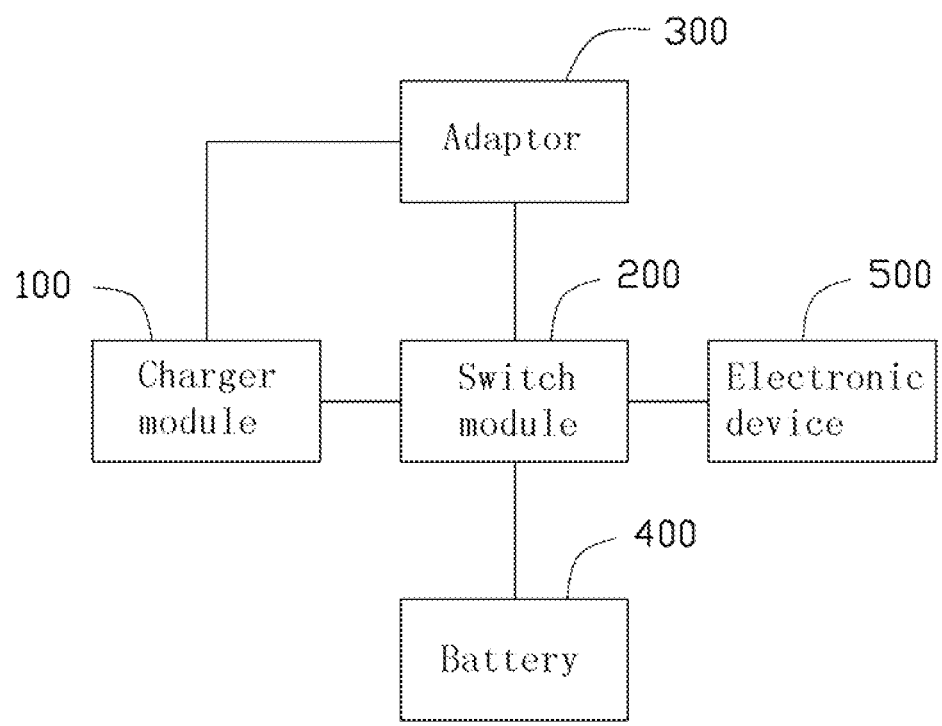
FIG. 1 is a block view of a power supply switch system in accordance with an embodiment.

Referring to FIG. 1, a power supply switch system for switching power supply to an electronic device 500, includes a charger module 100, a switch module 200, an adaptor 300 and a battery 400.

The charger module 100 receives a voltage signal from the adaptor 300 and outputs control signals according to the voltage signal. The switch module 200 receives the control signals and switches the adaptor 300 and the battery 400 to provide power supply to the electronic device 500. When the adaptor 300 is powered on, the charger module 100 controls the switch module 200 to turn off a first connection between the battery 400 and the electronic device 500. The charger module 100 controls the switch module 200 to turn on a second connection between the adaptor 300 and the electronic device 500. The adaptor 300 provides the power supply to the electronic device 500.

Figure 2:
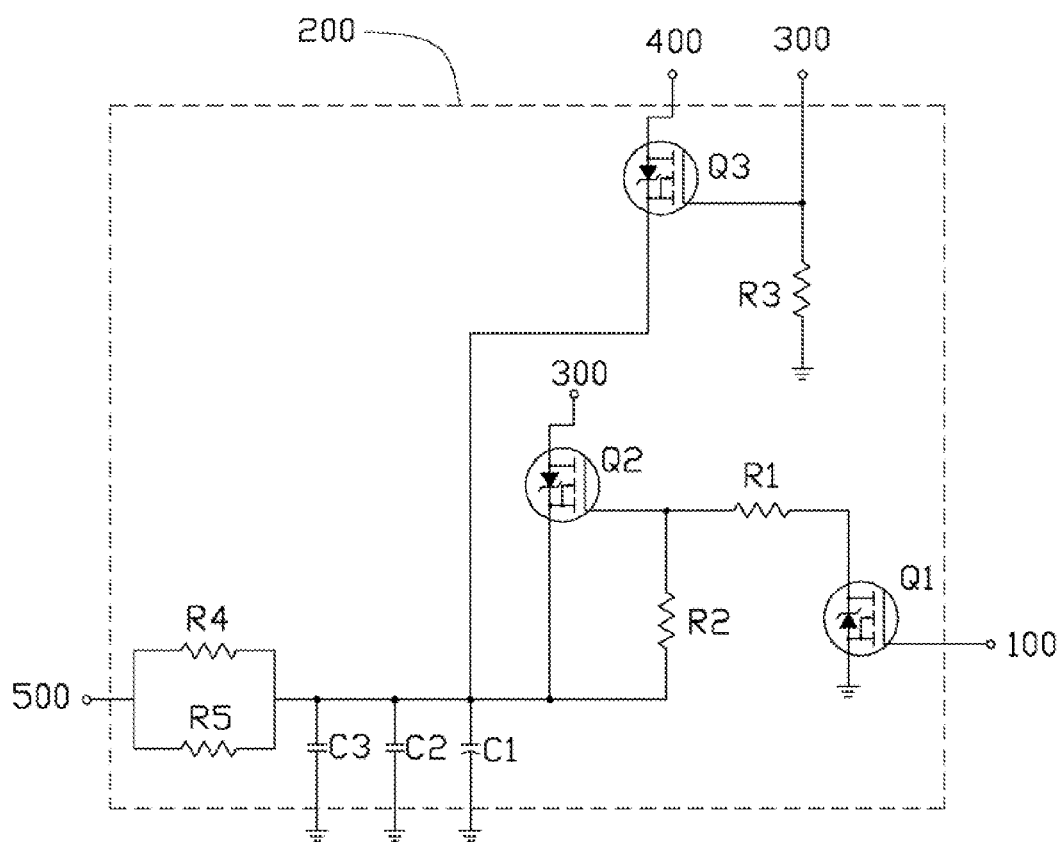
FIG. 2 is a circuit view of the embodiment of FIG. 1.

Referring to FIG. 2, the switch module 200 includes a first MOSFET Q1, a second MOSFET Q2 and a third MOSFET Q3. The first MOSFET Q1 includes a first MOSFET grid, a first MOSFET source and a first MOSFET drain. The second MOSFET Q2 includes a second MOSFET grid, a second MOSFET source and a second MOSFET drain. The third MOSFET Q3 includes a third MOSFET grid, a third MOSFET source and a third MOSFET drain.

The first MOSFET grid is electrically connected to the charger module 100 for receiving the control signals. The first MOSFET source is grounded. The first MOSFET drain is electrically connected to the second MOSFET grid via a first resistor R1. The second MOSFET source is electrically connected to the second MOSFET grid via a second resistor R2. The second MOSFET source is electrically connected to the third MOSFET source. The second MOSFET drain is electrically connected to the adaptor 300.

The third MOSFET grid is electrically connected to the adaptor 300. The third MOSFET grid is grounded via a third resistor R3. A connection point between the third MOSFET source and the second MOSFET source is grounded via a plurality of parallel capacitors C1~C3. The connection point between the third MOSFET source and the second MOSFET source is electrically connected to the electronic device 500 via two parallel resistors R4 and R5. The third MOSFET drain is electrically connected to the battery 400. In one embodiment, the first MOSFET Q1 is an N-channel MOSFET; the second MOSFET Q2 and the third MOSFET Q3 are P-channel MOSFETs.

Figure 3:
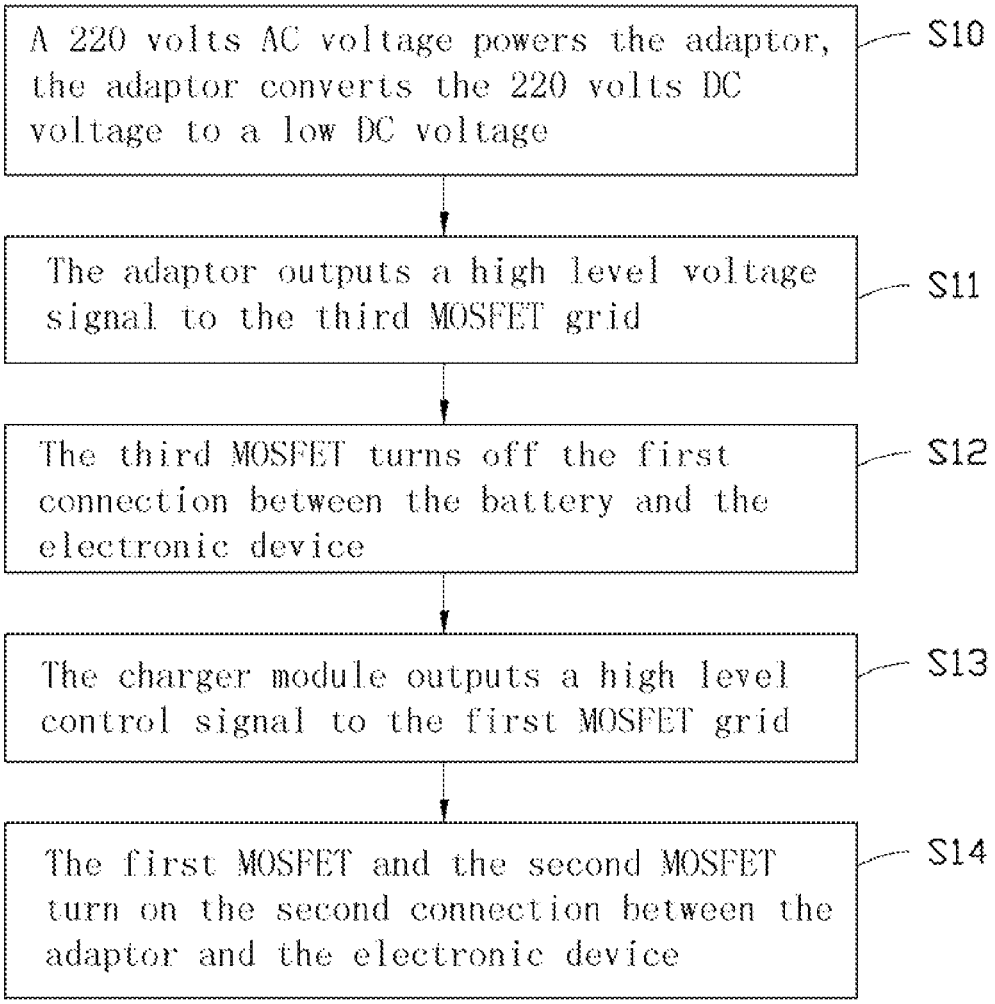
FIG. 3 is a flow chart of a method for switching the system to be powered by the adaptor.

FIG. 3 is a flow chart illustrating a method for switching the system to be powered up by the adaptor. Depending on the embodiment, certain steps described below may be removed, while others may be added, and the sequence of the steps may be altered. In one embodiment, the method for exposing photograph by separated parts in a camera device utilizing the above-described system includes the following steps:

S10: a 220 volts AC voltage powers the adaptor 300, the adaptor 300 converts the 220 volts DC voltage to a low DC voltage;

S11: the adaptor 300 outputs a high level voltage signal to the third MOSFET grid;

S12: the third MOSFET Q3 turns off the first connection between the battery 400 and the electronic device 500;

S13: the charger module 100 outputs a high level control signal to the first MOSFET grid;

S14: the first MOSFET Q1 and the second MOSFET Q2 turn on the second connection between the adaptor 300 and the electronic device 500.

Figure 4:
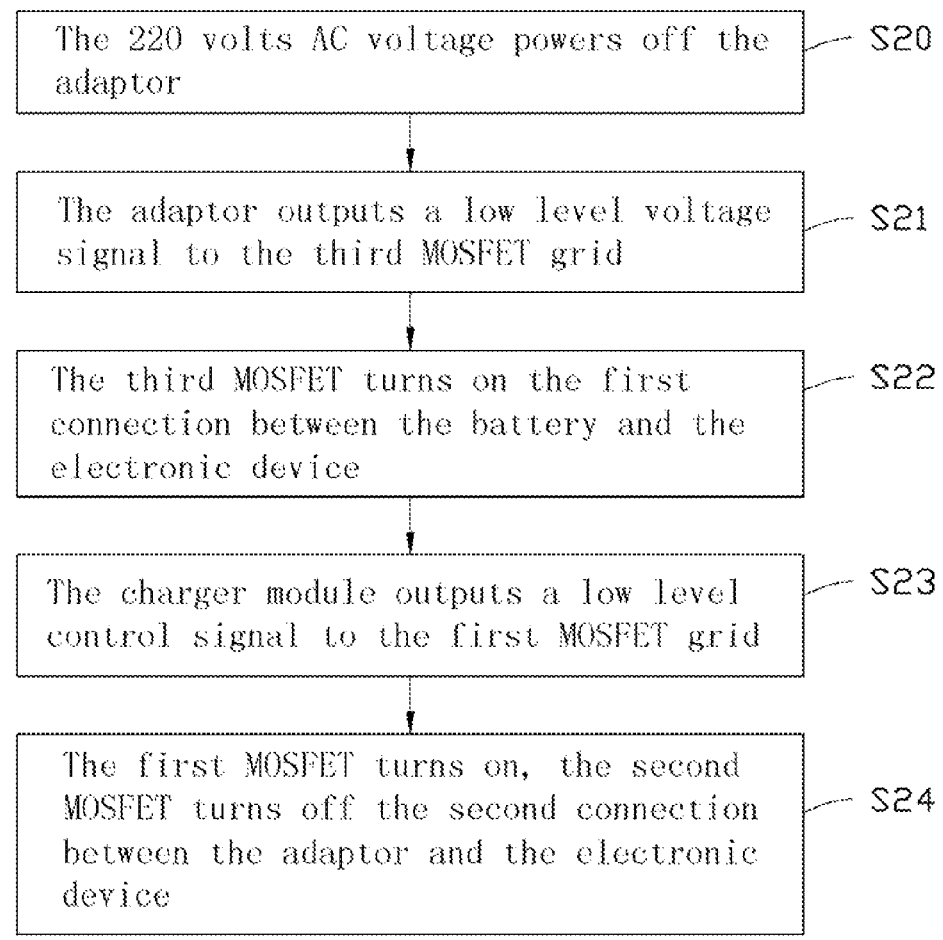
FIG. 4 is a flow chart of a method for switching the system to be powered by the battery.

FIG. 4 is a flow chart illustrating a method for switching the system to be powered up by the battery. Depending on the embodiment, certain steps described below may be removed, while others may be added, and the sequence of the steps may be altered. In one embodiment, the method for exposing photograph by separated parts in a camera device utilizing the above-described system includes the following steps:

S20: the 220 volts AC voltage powers off the adaptor 300;

S21: the adaptor 300 outputs a low level voltage signal to the third MOSFET grid;

S22: the third MOSFET Q3 turns on the first connection between the battery 400 and the electronic device 500;

S23: the charger module 100 outputs a low level control signal to the first MOSFET grid;

S24: the first MOSFET Q1 turns on, the second MOSFET Q2 turns off the second connection between the adaptor 300 and the electronic device 500.

In one embodiment, the switches the adaptor 300 and the battery 400 provide power supply to the electronic device 500 according to the control signals. When the adaptor 300 is powered on by the 220 volts AC voltage, the charger module 100 turns off the first connection between the battery 400 and the electronic device 500 and turns on the second connection between the adaptor 300 and the electronic device 500. Therefore, no power is wasted when the source is switched between the battery 400 and the 220 volts AC voltage powers the adaptor 300.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the invention to the full extent indicated by the broad general meaning of the terms in which the appended claims are expressed. It is also to be understood that the above description and the claims drawn to a method may include some indication in reference to certain steps. However, the indication used is only to be viewed for identification purposes and not as a suggestion as to an order for the steps.

What is claimed is:

1. A power supply switch system for switching power supply to an electronic device, comprising:
an adaptor adapted to output a voltage signal;
a charger module adapted to receive the voltage signal and output control signals;
a battery electrically connected to the charger module; and
a switch module adapted to receive the control signals and switch the adaptor and the battery to provide power supply to the electronic device; wherein when the adaptor is powered on, the charger module is adapted to control the switch module to turn off a first connection between the battery and the electronic device; the charger module is adapted to control the switch module to turn on a second connection between the adaptor and the electronic device; and the adaptor is adapted to provide the power supply to the electronic device; the switch module comprises a first MOSFET, a second MOSFET and a third MOSFET; the first MOSFET comprises a first MOSFET gate, a first MOSFET source and a first MOSFET drain; the second MOSFET comprises a second MOSFET gate, a second MOSFET source and a second MOSFET drain; the third MOSFET comprises a third MOSFET gate, a third MOSFET source and a third MOSFET drain; the first MOSFET gate is electrically connected to the charger module for receiving the control signals; the first MOSFET source is grounded; and the first MOSFET drain is electrically connected to the second MOSFET gate; the second MOSFET source is electrically connected to the electronic device; the second MOSFET drain is electrically connected to the adaptor; the third MOSFET gate is electrically connected to the adaptor; the third MOSFET source is electrically connected to the electronic device; and the third MOSFET drain is electrically connected to the battery.

2. The power supply switch system of claim 1, wherein the first MOSFET is a N-channel MOSFET; the second MOSFET and the third MOSFET are P-channel MOSFETs.

3. The power supply switch system of claim 1, wherein a connection point between the third MOSFET source and the second MOSFET source is grounded via a plurality of parallel capacitors.

4. The power supply switch system of claim 1, wherein the connection point between the third MOSFET source and the second MOSFET source is electrically connected to the electronic device via two parallel resistors.

5. The power supply switch system of claim 2, wherein when the adaptor is powered on by an AC voltage, the adaptor is adapted to output a high level voltage signal to the switch module; the first MOSFET and the second MOSFET are adapted to turn on the second connection between the adaptor and the electronic device; and the third MOSFET is adapted to turn off the first connection between the battery and the electronic device.

6. The power supply switch system of claim 2, wherein when the adaptor is powered off by an AC voltage, the adaptor is adapted to output a low level voltage signal to the switch module; the third MOSFET is adapted to turn on the first connection between the battery and the electronic device; the first MOSFET is adapted to turn on; and the second MOSFET is adapted to turn off the second connection between the adaptor and the electronic device.

7. A power supply switch system for switching power supply to an electronic device, comprising:
an adaptor adapted to output a voltage signal;
a charger module adapted to receive the voltage signal and output control signals;
a battery electrically connected to the charger module; and
a switch module adapted to receive the control signals and switch the adaptor and the battery to provide power supply to the electronic device; wherein when the adaptor is powered off, the charger module is adapted to control the switch module to turn on a first connection between the battery and the electronic device; the charger module is adapted to control the switch module to turn off a second connection between the adaptor and the electronic device; and the battery is adapted to provide the power supply to the electronic device; the switch module comprises a first MOSFET, a second MOSFET and a third MOSFET; the first MOSFET comprises a first MOSFET gate, a first MOSFET source and a first MOSFET drain; the second MOSFET comprises a second MOSFET gate, a second MOSFET source and a second MOSFET drain; the third MOSFET comprises a third MOSFET gate, a third MOSFET source and a third MOSFET drain; the first MOSFET gate is electrically connected to the charger module for receiving the control signals; the first MOSFET source is grounded; and the first MOSFET drain is electrically connected to the second MOSFET gate; the second MOSFET source is electrically connected to the electronic device; the second MOSFET drain is electrically connected to the adaptor; the third MOSFET gate is electrically connected to the adaptor; the third MOSFET source is electrically connected to the electronic device; and the third MOSFET drain is electrically connected to the battery.

8. The power supply switch system of claim 7, wherein the first MOSFET is a N-channel MOSFET; the second MOSFET and the third MOSFET are P-channel MOSFETs.

9. The power supply switch system of claim 7, wherein a connection point between the third MOSFET source and the second MOSFET source is grounded via a plurality of parallel capacitors.

10. The power supply switch system of claim 7, wherein the connection point between the third MOSFET source and the second MOSFET source is electrically connected to the electronic device via two parallel resistors.

11. The power supply switch system of claim 8, wherein when the adaptor is powered on by an AC voltage, the adaptor is adapted to output a high level voltage signal to the switch module; the first MOSFET and the second MOSFET are adapted to turn on the second connection between the adaptor and the electronic device; and the third MOSFET is adapted to turn off the first connection between the battery and the electronic device.

12. The power supply switch system of claim 8, wherein when the adaptor is powered off by an AC voltage, the adaptor is adapted to output a low level voltage signal to the switch module; the third MOSFET is adapted to turn on the first connection between the battery and the electronic device; the first MOSFET is adapted to turn on; and the second MOSFET is adapted to turn off the second connection between the adaptor and the electronic device.

* * * * *